M. H. LOCKWOOD.
TYPE WRITING MACHINE.
APPLICATION FILED JUNE 27, 1912.
1,118,140.
Patented Nov. 24, 1914.
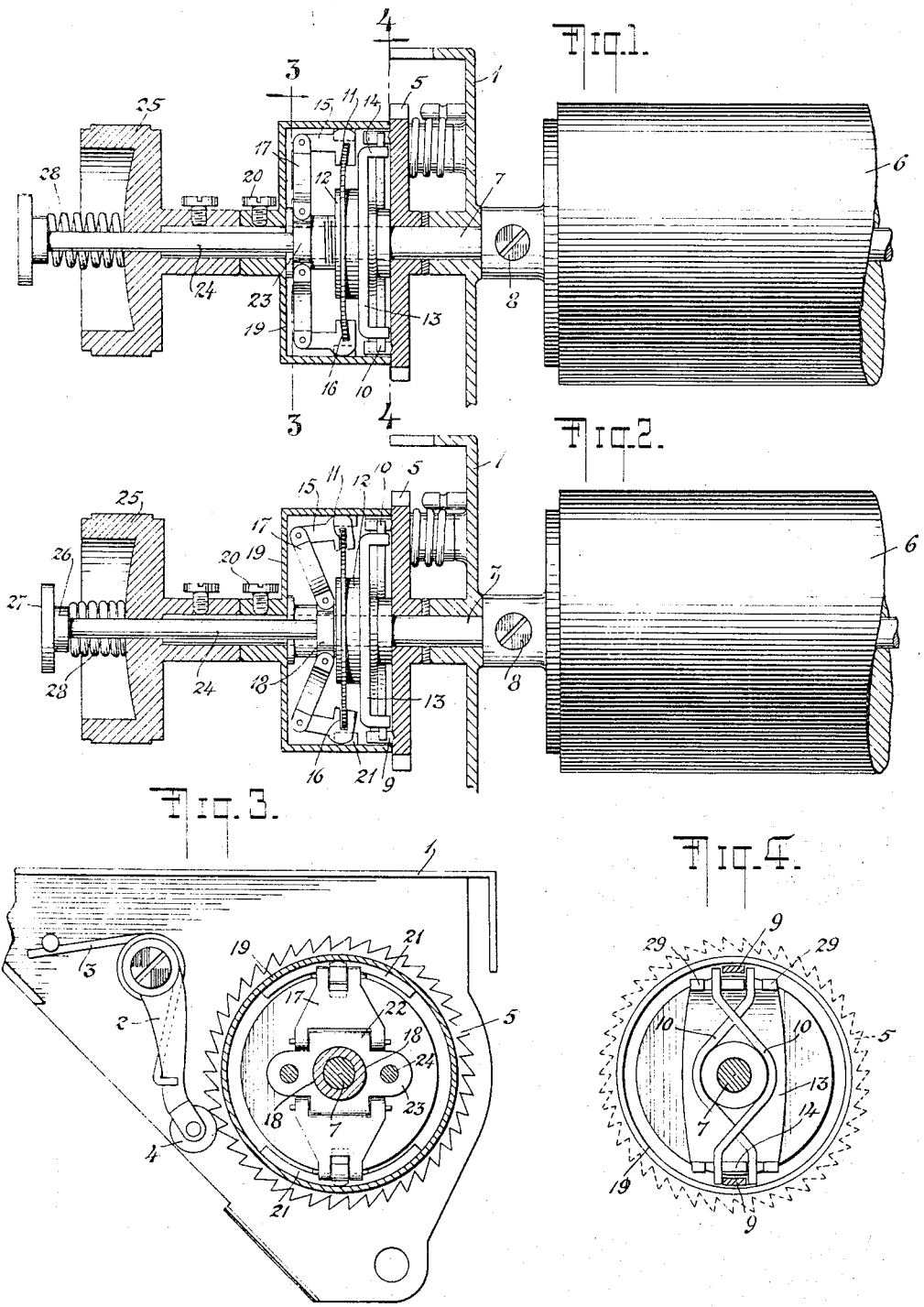
WITNESSES
INVENTOR
MARQUIS H. LOCKWOOD
BY
ATTORNEYS

UNITED STATES PATENT OFFICE.

MARQUIS H. LOCKWOOD, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,118,140.      Specification of Letters Patent.      Patented Nov. 24, 1914.

Application filed June 27, 1912. Serial No. 706,128.

*To all whom it may concern:*

Be it known that I, MARQUIS H. LOCKWOOD, a citizen of the United States, and resident of the borough of Manhattan, city, county, and State of New York, have invented certain new and useful Improvements in Type-Writing Machines, of which the following is a specification.

My invention relates more particularly to typewriter platen releases such as are adapted to normally hold the platen and line space wheel together to revolve in unison, but which, by a suitable finger key, may be released so that the platen may be revolved independently of the line space wheel, and again connected thereto, at any point, when the finger key is released. Friction clutches of some form are usually used for connecting the line space wheel to the platen but in some instances they are liable to slip when the line space lever is quickly operated as by a sharp blow.

The object of my invention is to provide a friction clutch which does not depend entirely on the friction between the clutching members but is provided with one member of flexible spring stock which is adapted to be bent or flexed by the other member when frictionally gripped thereby.

My construction further embodies a resilient connection between the flexible disk clutch member and the line space wheel, which will act as a shock absorber and tend to dissipate the shock of a sudden blow on the line space wheel and thus more effectually prevent slipping of the clutch.

One form of my invention is shown in the accompanying drawings of which—

Figure 1 is a longitudinal partial section with the clutch closed. Fig. 2 is a similar section showing the clutch in the open position. Fig. 3 is an end view of a transverse section at 3—3 of Fig. 1, and Fig. 4 is a section at 4—4 of Fig. 1 looking toward the left.

My improvement is shown in connection with the well-known Underwood typewriter, but it will be understood that it may be adapted to other makes of machines.

In the drawings, 1 represents a portion of the typewriter platen carriage which carries the detent pawl 2 which is spring-actuated in the usual manner, the spring 3 being adapted to hold the roller 4 in the teeth of the line space wheel 5 and thereby position the platen. The platen 6 is secured to the shaft or axle 7 by the screw 8 or in any desired manner. The line space wheel 5 is revolubly mounted upon the shaft 7 and is provided in the present instance with two laterally-extending lugs 9 which are adapted to coöperate with two cushion springs 10 in the manner hereinafter described.

The platen and line space wheel are adapted to be normally secured together by means of a clutch which, in the form here shown, is comprised of a thin, flexible spring metal disk 11 which is secured to the collar 12, which collar is adapted to revolve on the shaft 7. The collar 12 is also provided with a plate or a cross bar 13 having two laterally extending lugs 14, which lugs are adapted to lie adjacent to and parallel with the lugs 9 extending from the line-space wheel 5. The springs 10 partially loop around the hub of the collar 12 and contact at each end with lugs 9 and 14 as clearly shown in Fig. 4 of the drawings. This arrangement provides a resilient connection between the line-space wheel 5 and the flexible disk 11 for the purpose of providing a shock absorber to prevent the shock of a sudden blow upon the line space wheel, reaching the clutch. The flexible disk 11 forms one of the clutch members, and is adapted to be frictionally gripped and the edge thereof flexed or bent, as indicated in Fig. 1 of the drawings, by the other clutch members 15, two of which are here represented, but it will be understood that any desired number may be used. The clutch members 15 are provided with slots 16 which are adapted to fit loosely over the edge of the disk 11 when the clutch members 15 are in the position shown in Fig. 2 of the drawings, in which position the clutch is open and the platen may be rotated independently of the line space wheel. Connected with each clutch member 15 is a toggle link 17, the opposite end of each of which is pivotally connected with the sliding collar member 18 which is mounted to slide on the shaft 7.

The clutch members and the shock absorbing connections above enumerated are inclosed in the casing 19 which is secured to the shaft 7 by the set screw 20. The casing 19 is provided with inwardly extending lugs 21, one on each side of each of the clutch members 15. The clutch members 15 are adapted to be rocked radially when the collar 18 is moved on the shaft 7, but the lugs 21 will prevent any circumferential movement of these members with respect to the platen 6, for as pointed out, the platen and the casing 19 are both secured to the shaft 7.

The slidable collar member 18 is provided with two sets of laterally extending lugs or ears, to one set of which, 22, the toggle links 17 are pivotally connected. It will be seen from this arrangement that movement of the collar member 18 from the position shown in Fig. 1 to the position shown in Fig. 2 changes the direction of thrust of the links 17 and draws the connected ends of the clutch members 15 inward toward the shaft or axle by thus permitting the disk 11 to straighten and releasing the grip of the notches 16 thereon. The reverse action will take place as the collar 18 is moved from the position in Fig. 2 to that in Fig. 1 to close the clutch and secure the platen and line space wheel together. The other ears or lugs 23 are provided with outwardly extending rods 24 which are adapted to extend through holes in the casing 19 and also through holes in the knurled finger wheel 25. The outer ends of the rods 24 are connected together by a cross piece 26 which is provided with a finger button 27, the arrangement being such that by moving the finger button and rods inward from the position represented in Fig. 1 to the position represented in Fig. 2 the clutch will be open and the platen may be rotated independently of the line space wheel. A spring 28 is provided between the finger wheel and the cross piece 26, which spring is adapted to force the rods together with the collar 18 outward and hold the members in the position indicated in Fig. 1 of the drawings, this being the normal position with the clutch closed.

The operation of the platen release will be sufficiently understood from the above description taken in connection with Figs. 1 and 2, and it will be seen from Fig. 1 that the edge of the disk 11 is flexed or bent at the two points where it is gripped by the clutch members 15. It will be understood that by flexing the disk as indicated, considerable advantage is gained in the gripping action between the two clutch members. This, taken in connection with the cushioning springs 10 greatly reduces the likelihood of one of the clutch members slipping relative to the other. It will be seen that a sudden blow given to the line space wheel will be transmitted through the lugs 9 and the springs 10 to turn the cross bar or plate 13 which as previously explained, is connected with the collar 12 and hence with the disk 11. With this resilient connection between the line space wheel and the disk 11 any sudden shock such as would be given by a blow on the line space lever would be partially absorbed by the springs 10, the tension of which is not sufficient to cause the clutch to slip.

The springs 10 are made of sufficient strength to overcome the resistance of turning the platen so that as soon as the line space wheel is stopped, if the platen overthrows it will at once be brought back or positioned properly with relation to the line space wheel; hence the springs 10 not only act as a shock absorbing device when a sudden blow is given to the line space wheel, but also in suddenly stopping the line space wheel. To prevent excessive overthrow of the springs 10, the plate 13 is provided with additional lugs 29 one on each side of each of the lugs 14, which, as will be seen from Fig. 4 will prevent the springs 10 from being over compressed or thrown too far by contact of the lugs 9 therewith.

Various modifications may be made within the scope of the claims without departing from the spirit of my invention.

I claim—

1. In a typewriting machine the combination of a platen, a line space wheel, and a clutch for connecting the platen and line space wheel to revolve in unison, comprising a flexible, resilient disk, intermediate means securing said disk to the line space wheel and means connected with the platen for gripping and flexing the edge of said disk whereby transverse stresses of the flexed resilient disk are brought into action to prevent slipping of the clutch.

2. In a typewriting machine the combination of a platen, a line space wheel, a flexible resilient disk separate from but connected to revolve with the line space wheel and means connected with said platen adapted to grip and flex the edge of said disk and thereby bring into action the transverse stresses of the flexed resilient disk for connecting the platen and said line space wheel to revolve in unison.

3. In a typewriting machine the combination of a platen, a line space wheel, a flexible resilient disk, resilient means connecting the line space wheel with said disk and means connected with said platen adapted to grip and flex the edge of said disk and thereby bring into action the transverse stresses of the flexed resilient disk for connecting the platen and said line space wheel to revolve in unison, said resilient means being adapted to absorb the shock and thereby prevent slipping of said disk with respect to the flexing and gripping means when suddenly starting rotation of the platen by means of the line space wheel.

4. In a typewriting machine the combination of a platen, a line space wheel, a flexible resilient disk separate from but connected to said line space wheel, movable members connected with the platen and adapted to cooperate with said disk for gripping and flexing the edge thereof and means for moving said clutch members to grip and flex the edge of said disk and thereby bring into action the transverse stresses of the flexed resilient disk to connect said platen and the line space wheel to revolve in unison.

5. In a typewriting machine the combination of a platen, a line space wheel, a flexible resilient disk separate from but connected to said line space wheel, movable levers adapted to revolve with said platen provided with means for gripping the edge of said disk and means for moving said levers to grip and flex the edge of said disk and thereby bring into action the transverse stresses of the flexed resilient disk to connect said platen and the line space wheel to revolve in unison.

6. In a typewriting machine the combination of a platen provided with an axle, a line space wheel loosely mounted on said axle, a flexible resilient disk resiliently connected to said line space wheel, means connected with said platen and adapted to be moved to grip and flex the edge of said disk and spring actuated means for moving said last named means to grip and flex the edge of said disk and thereby bring into action the transverse stresses of the flexed resilient disk to connect said platen and the line space wheel to revolve in unison.

7. In a typewriting machine the combination of a platen provided with an axle, a line space wheel loosely mounted on said axle, a flexible, resilient disk, resilient means connecting said disk to the line space wheel, clutch levers connected to revolve with said platen and adapted to be moved to grip and flex the edge of said disk, toggle links for moving said clutch levers and means for actuating said toggle links.

8. In a typewriting machine the combination of a platen, a line space wheel, a flexible resilient disk resiliently connected to said line space wheel, movable clutch members revoluble with the platen, adapted to grip and flex the edge of said disk, toggle links for moving said clutch members, and a sliding member adapted to operate said toggle links to cause said clutch members to grip and flex said disk and thereby connect the platen and line space wheel to revolve in unison.

9. In a typewriting machine the combination of a platen, a line space wheel, a flexible resilient disk separate from but connected to said line space wheel, movable members revoluble with the platen, adapted to grip and flex the edge of said disk, means for moving said movable members to effect the gripping and flexing of said disk and thereby bring into action the transverse stresses of the flexed resilient disk to connect the platen and line space wheel to revolve in unison and means adapted to be operated manually to release said movable members from said disk for revolving the platen independently of said line space wheel.

In testimony whereof I have hereunto set my hand in the presence of two subscribing witnesses.

MARQUIS H. LOCKWOOD.

Witnesses:
 JOHN A. KEHLENBECK,
 F. WILLIAM DECKMANN.